United States Patent [19]

Peterson

[11] Patent Number: 5,131,988
[45] Date of Patent: Jul. 21, 1992

[54] METHOD OF EXTRACTING LITHIUM FROM ALUMINUM-LITHIUM ALLOYS

[75] Inventor: Ray D. Peterson, Florence, Ala.

[73] Assignee: Reynolds Metals Company, Richmond, Va.

[21] Appl. No.: 684,124

[22] Filed: Apr. 12, 1991

[51] Int. Cl.$^5$ .............. C25C 3/02; C25C 3/36; C01D 1/32; C22B 26/12

[52] U.S. Cl. .................. 204/68; 204/71; 75/590; 75/690; 423/179.5; 423/499

[58] Field of Search .............. 204/71, 68, 60; 423/179.5, 499; 75/590, 690

[56] References Cited

U.S. PATENT DOCUMENTS

| | | | |
|---|---|---|---|
| 3,298,935 | 1/1967 | Henrie et al. | 204/71 X |
| 3,728,234 | 4/1973 | Sakai et al. | 204/68 |
| 3,872,220 | 3/1975 | Smith, Jr. | 423/499 |
| 4,455,202 | 6/1984 | Sintim-Damoa et al. | 204/68 |
| 4,533,442 | 8/1985 | Neelameggham et al. | 204/71 X |
| 4,738,759 | 4/1988 | Bienvenu et al. | 204/71 X |
| 4,780,186 | 10/1988 | Christini et al. | 204/68 |
| 4,790,917 | 12/1988 | Dewing | 204/140 |
| 4,802,970 | 2/1989 | Mamantov | 204/60 |
| 4,849,072 | 8/1989 | Bowman | 204/68 |
| 4,853,094 | 8/1989 | Honders et al. | 204/71 X |
| 4,882,017 | 11/1989 | Weaver | 204/71 |
| 4,973,390 | 11/1990 | Christini et al. | 204/68 |
| 5,024,737 | 6/1991 | Claus et al. | 204/71 |

FOREIGN PATENT DOCUMENTS

| | | | |
|---|---|---|---|
| 43174 | 4/1979 | Japan | 423/179.5 |
| 200731 | 11/1984 | Japan | 423/179.5 |
| 155934 | 1/1963 | U.S.S.R. | 75/590 |

*Primary Examiner*—Donald R. Valentine
*Attorney, Agent, or Firm*—Alan M. Biddison

[57] ABSTRACT

An improved method for extracting lithium from aluminum-lithium alloys includes providing an electrorefining cell which contains a cathode comprising a pure molten tin pool and a source of lithium from a molten aluminum-lithium alloy. The lithium is extracted from the Al-Li alloy by applying an electric current through the electrorefining cell whereby lithium dissolves from the molten Al-Li alloy into the tin pool and forms a tin-lithium alloy. The formed Sn-Li alloy may be recovered by casting under a salt layer and cooled to solidification. In a further aspect, the recovered Sn-Li alloy may be processed to further recover lithium therefrom by either electrolytic recovery in a separate electrolytic cell, vacuum distillation or a chemical extraction process.

10 Claims, 3 Drawing Sheets

METHOD OF EXTRACTING LITHIUM FROM ALUMINUM-LITHIUM ALLOYS

FIELD OF THE INVENTION

The present invention relates to an improved method for extracting lithium from aluminum-lithium (Al-Li) alloys using electrorefining techniques, wherein the lithium from the aluminum-lithium alloy is recovered as a tin-lithium (Sn-Li) alloy. The recovered tin-lithium alloy is subsequently processed to recover lithium or a lithium compound.

BACKGROUND OF THE INVENTION

Aluminum-lithium alloys have distinct advantages over conventional aluminum alloys for use in weight sensitive applications such as aircraft manufacture. The combination of light weight with high structural integrity for Al-Li alloys in aircraft applications permits increased fuel savings. As a result of these advantages, major aluminum fabricators have worked to develop processes for manufacturing these alloys into useful wrought forms. The manufacturing of Al-Li alloys presents process control and maintenance problems due to the corrosive nature of the aluminum-lithium alloy and the tendency for lithium to volatilize. When aluminum and lithium are combined together, the corrosive nature is greater than either of the two components individually. As a result of these problems, aluminum fabricators add the lithium alloy addition to the aluminum melts as late as possible during the alloy manufacturing process to minimize any adverse effects.

Due to the increased use of aluminum-lithium alloys in aircraft manufacture, an increased amount of Al-Li scrap has been generated which must be recycled. However, reclamation and recovery of the aluminum-lithium scrap can present problems due to the corrosive nature of the material. Standard melting techniques under conventional salt flux layers can result in damage to the refractory linings of the furnace, as well as low yields due to loss of the valuable lithium component.

In response to these problems, processes have been developed to selectively remove the lithium from the aluminum-lithium scrap material so that the aluminum may be utilized for other purposes and the valuable pure lithium, costing on the order of $25.00/lb, may be re-used as an alloy additive.

U.S. Pat. Nos. 4,780,186 and 4,973,390 to Christini et al. and U.S. Pat. No. 4,849,072 to Bowman disclose a method for recovering lithium from aluminum-lithium alloy scrap using an electrolytic cell. In these patents, an electrolytic cell is provided which utilizes the varying density of three phases: an Al-Li scrap alloy (heaviest), a molten salt (middle range), and lithium (lightest). An electric current is passed through the cell thereby reducing lithium ions to lithium metal so that lithium is removed from the uppermost layer in the three layer electrolytic cell. One drawback to this process is the operating temperature of the electrolytic cell. As opposed to standard lithium electrowinning cells, the cell temperature for these types of processes is 200° C. higher. This higher temperature results in an electrorefining cell which will greatly promote oxidation and loss of any lithium which has been recovered. It will also enhance the lithium solubility in the molten salt causing an increase in the back reaction and current efficiency loss which will result in an overall extremely low current efficiency.

U.S. Pat. No. 4,790,917 to Dewing discloses another method of refining lithium-containing aluminum scrap using an electrolytic cell. In this method, an Al-Li molten alloy is used as an anode, a mixture of lithium chloride and other chloride salts is used as an electrolyte and either molten aluminum or lithium may be used as the cathode. The anode pool is separated from the cathode pool by a barrier and both pools are covered by the electrolyte. In one disclosed embodiment, the lithium from the scrap is transported to the pure aluminum pool and thus recovered as an aluminum-lithium alloy. The drawback for this process is that the recovered lithium is still in the form of a binary Al-Li alloy. Although the lithium may have been separated from other trace elements in the scrap, the recovered product still is in a highly reactive form. This product form limits the use of the recovered Al-Li product to recycle material for aluminum-lithium alloys or as a product requiring only the chemical reducing power of aluminum, such as a steel oxidizer. In addition, although the cell arrangement may have a low Nernst potential, the cell may have a high total cell drop due to the presence of the barrier and the bath IR drop may also be high. Another major drawback to this system is that since an Al-Li product is produced, a protective salt layer will be required to prevent oxidation when removing the product from the cell. Also, the process requires a source of pure aluminum when aluminum is used as a cathode.

None of these patents teaches or fairly suggests a method of extracting lithium from an aluminum-lithium alloy which utilizes an electrolytic cell and a pure molten tin pool as the cathode, thereby resulting in recovering the lithium from the Al-Li alloy in the form of a tin-lithium alloy. Furthermore, none of these patents teaches or suggests further recovery of the lithium from the produced Sn-Li alloy by methods such as electrolytic cells, vacuum distillation or chemical conversion.

U.S. Pat. No. 4,455,202 to Sintim-Damoa et al. discloses a method of producing lithium by electroreduction in a fused salt electrolyte. In this method, a liquid tin metal cathode is used to recover lithium from a lithium compound such as lithium oxide. The teachings of this patent are different from that of the present invention in that the Sintim-Damoa et al. reference does not disclose recovering lithium from an aluminum-lithium alloy.

U.S. Pat. No. 4,882,017 to Weaver discloses a method of making a light metal-alkali metal master alloy using an electrolytic cell. The teachings of Weaver are different from the present invention in that the inventive method is designed to recover lithium from scrap material rather than to produce a lithium alloy as is disclosed by Weaver.

U.S. Pat. No. 3,728,234 to Sakai et al. discloses an electrolytic cell that identifies tin as one of a number of liquid metals that may be used as a cathode. Again, Sakai et al. does not teach or suggest extracting lithium from aluminum-lithium alloys using a pool of molten tin as a cathode in an electrolytic cell.

In response to the deficiencies in prior art processes, a need has developed to provide methods for extracting lithium from aluminum-lithium alloys which extract lithium in a more usable and less volatile form. In response to this need, Applicant has developed a process which will be described hereinafter which extracts lithium from Al-Li alloys and produces a tin-lithium product which is much less reactive and more recoverable than prior art process products.

SUMMARY OF THE INVENTION

The present invention relates to an improved method for extracting lithium from aluminum-lithium alloys. The inventive method uses an electrorefining process to recover lithium as a tin-lithium alloy and further processes the recovered Sn-Li alloy to lithium or a lithium compound. The present invention includes the following interrelated aspects and features:

(a) In a first aspect, the method for extracting lithium from an aluminum-lithium alloy includes providing an electrorefining cell which initially includes therein a substantially pure molten tin pool which acts as a cathode during an electrorefining process.

(b) The electrorefining cell also includes a molten Al-Li alloy pool which provides the source of lithium for extraction. An electric current is passed through the cell while a negative cell electromotive force is maintained, whereby lithium from the molten Al-Li alloy is dissolved in the molten tin pool and forms a Sn-Li alloy.

(c) The formed tin-lithium alloy may be recovered by casting from the electrorefining cell under a salt layer, and cooled to solidification for further use.

(d) In a further aspect, the recovered tin-lithium alloy may be processed to recover lithium therefrom. These methods include a separate additional low temperature electrolytic cell, vacuum distillation or chemical extraction processes such as aqueous or molten metal conversion.

Accordingly, it is a first object of the present invention to provide an improved method for extracting lithium from aluminum-lithium alloys.

It is a still further object of the present invention to provide a method for extracting lithium which includes a single step electrorefining cell which utilizes a molten pool of tin as a cathode thereof to recover lithium as a tin-lithium alloy.

It is a still further object of the present invention to provide a method for extracting lithium which includes recovering the tin-lithium product produced thereby by casting under a salt layer and cooling to solidification.

It is yet a further object of the present invention to provide a method of extracting lithium which includes additional processing steps such as vacuum distillation, electrolytic cells or chemical extraction to recover lithium from the tin-lithium alloy produced during the electrorefining process.

These and other objects, aspects and features of the present invention will be better understood from the following detailed description of the preferred embodiments when read in conjunction with the appended drawing figures.

In satisfaction of the foregoing objects and advantages, there is provided a method for extracting lithium from an aluminum-lithium alloy by providing an electrorefining cell having a molten tin cathode, maintaining in the cell a molten aluminum-lithium alloy and recovering lithium from the aluminum-lithium alloy by passing an electric current through the cell such that lithium is dissolved in the molten tin pool and forms a tin-lithium alloy.

Also provided by the present invention are methods to recover lithium from the tin-lithium alloy produced in the electrorefining process such as vacuum distillation, further electrolytic cell recovery or chemical extraction.

BRIEF DESCRIPTION OF DRAWINGS

Reference is now made to the accompanying drawings wherein.

DESCRIPTION OF THE PREFERRED EMBODIMENTS

The method of the invention for extracting lithium from aluminum-lithium alloys avoids most of the problems associated with the prior art processes as described hereinabove. The inventive process can efficiently remove the lithium from the Al-Li scrap material as well as recover it in a useful form with just slightly more work.

The improved method of extracting lithium from aluminum-lithium alloys offers advantages over other attempts in the prior art to extract lithium from these types of materials. Using a pure molten tin as the cathode material rather than an aluminum or lithium molten material provides increased concentration of lithium in the form of a tin-lithium product. Furthermore, the use of a tin cathode and the very low activity coefficient for lithium in tin results in a negative cell EMF and a low overall cell voltage. In addition, lithium recovered as a Sn-Li alloy is more stable and readily usable for converting to lithium than lithium recovered in prior art processes which produce an Al-Li product. Producing a Sn-Li alloy also reduces the hazards associated with recovery of lithium from Al-Li alloys produced by electrorefining processes. Finally, the use of a molten tin cathode should result in higher lithium recovery due to a decrease in lithium loss mechanisms.

The inventive method of extracting lithium from an aluminum-lithium alloy is carried out using a first single step electrorefining cell process. In this step, a substantially pure tin pool is provided which acts as the cathode. It should be appreciated that the tin pool may also contain minor amounts of other elements, as long as such elements do not significantly interfere with the formation of the tin-lithium alloy or with the cell's efficiency. In conjunction with the cathodic tin pool, a molten Al-Li alloy pool, which may be derived from scrap materials, is provided as the anode, the tin pool being layered along side of the molten aluminum-lithium material in the cell. Other cell configurations are possible as known to those skilled in the art, such as the use of a diaphragm to maintain separation between the heavier tin pool and the lighter aluminum-lithium material. An electric current is then passed through the electrorefining cell while maintaining a negative cell electromotive force, whereby the lithium from the molten Al-Li alloy is dissolved in the tin pool and forms a tin-lithium alloy.

The cell electromotive force, EMF, or Nernst potential for an electrolytic cell having two pools designed to extract lithium from one pool and recover the extracted lithium in the other pool can be defined as follows:

$$E = RT/nF \ln(a_{Li,1}/a_{Li,2})$$

In this equation, R is the gas constant, T is the absolute temperature, F is the value of the Faraday Constant and $a_{Li,1}/a_{Li,2}$ is the ratio of lithium activities in the two metal pools.

Figure 1:
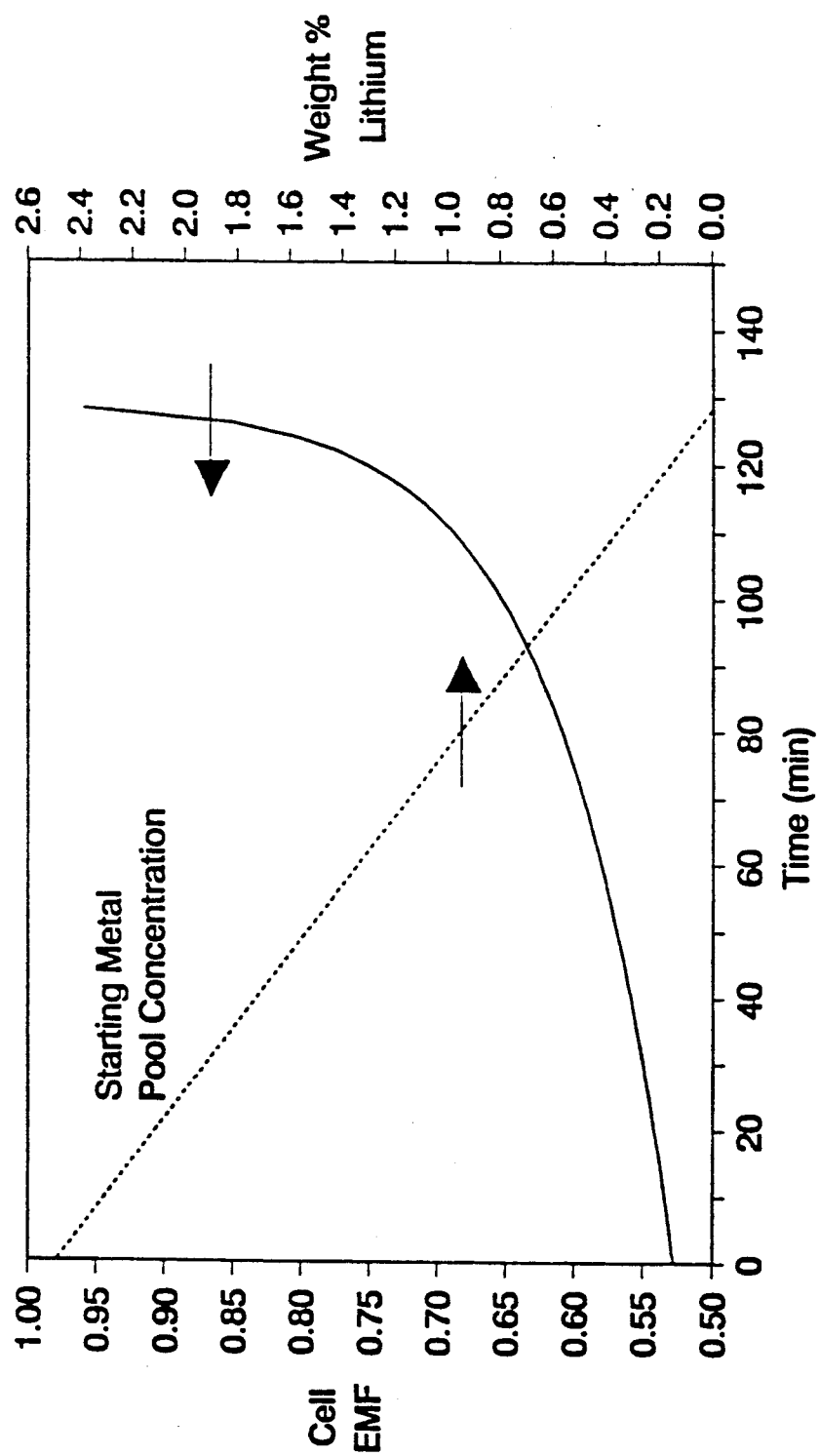
FIG. 1 depicts a graph showing the cell EMF voltage, processing time and lithium concentration for a first prior art process.

For the prior art process as described above in U.S. Pat. No. 4,780,186 which utilizes a pure lithium pool, the cell voltage is only a function of the aluminum-lithium composition and temperature. For a typical 100 gram Al-Li starting pool with 2.5% lithium and operated at 5 amps per hour, the activity coefficient for lithium in aluminum would be 0.2805. Using these values, predictions of Nernst potentials are shown in FIG. 1, which evidences a positive EMF during the processing time and a decrease in lithium concentration in the starting pool on the order of 2-3%. The major cell voltage component in this method would be the resistive drop associated with the molten salt bath and would raise the cell voltage by several volts over the EMF.

Figure 2:
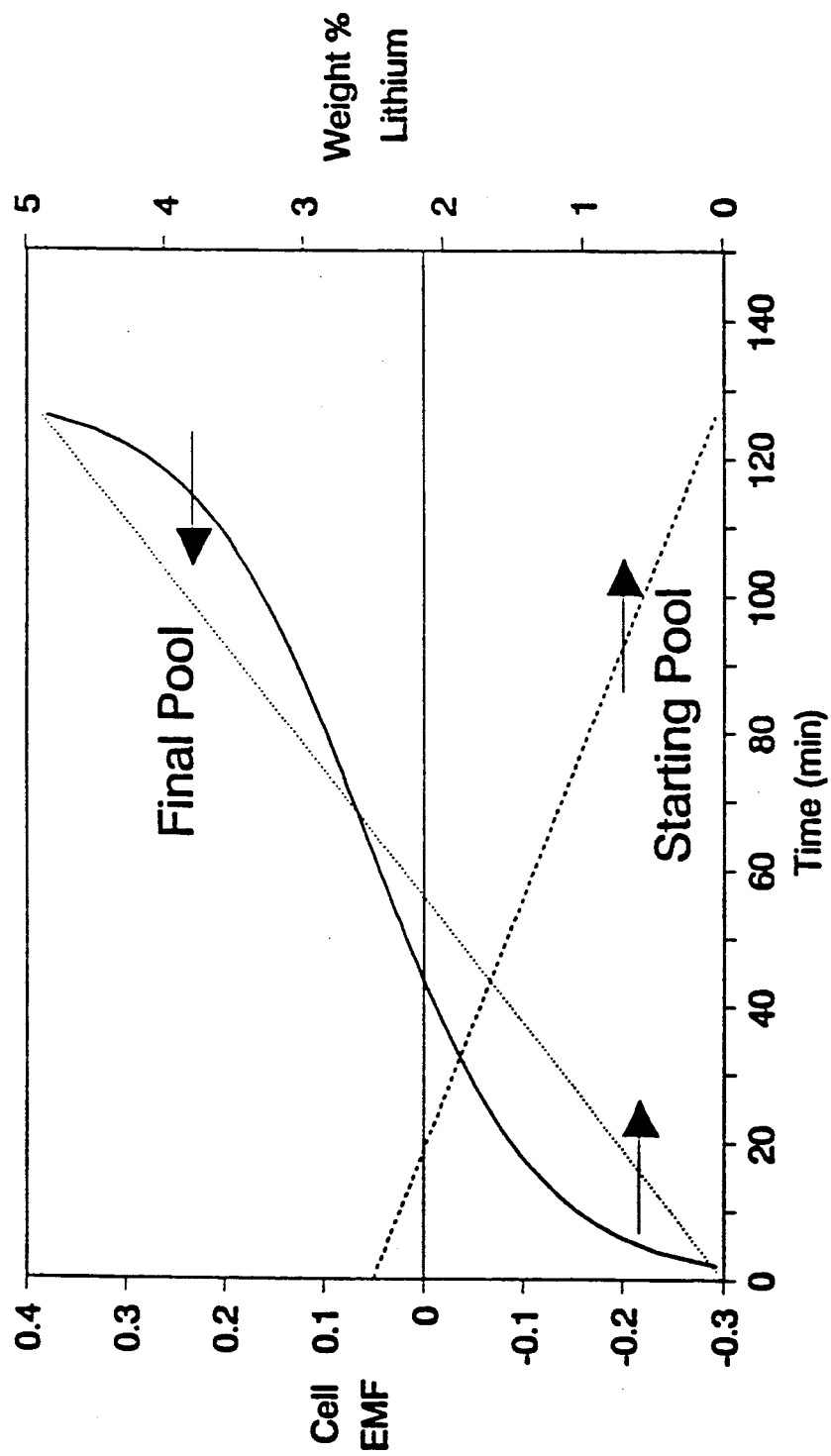
FIG. 2 depicts a graph showing the cell EMF voltage, processing time and lithium concentration for a second prior art process.

In contrast to this prior art method, the prior art method as described in U.S. Pat. No. 4,790,917 uses two aluminum-lithium pools to extract lithium. In this method, assuming that the activity of lithium in aluminum is nearly the same as the activity of lithium in an aluminum alloy, the Nernst potential or EMF is a function of the respective lithium concentrations in the two aluminum pools. These concentrations are dependent on the relative masses of the two pools and time. Using the same starting conditions as set forth for derivation of the curves in FIG. 1, but with a 50 gram aluminum cathode pool, the Nernst potentials and weight percent of lithium over time are depicted in FIG. 2. As can be seen from FIG. 2, initially the cell has a negative Nernst potential which acts as a cell driving force to equalize the lithium potentials in the two aluminum pools. However, over time and as lithium concentration increases in the cathodic region, the cell EMF becomes positive. All other cell components being equal, this cell would operate at a lower cell voltage than the previously described electrorefining cell.

Figure 3:
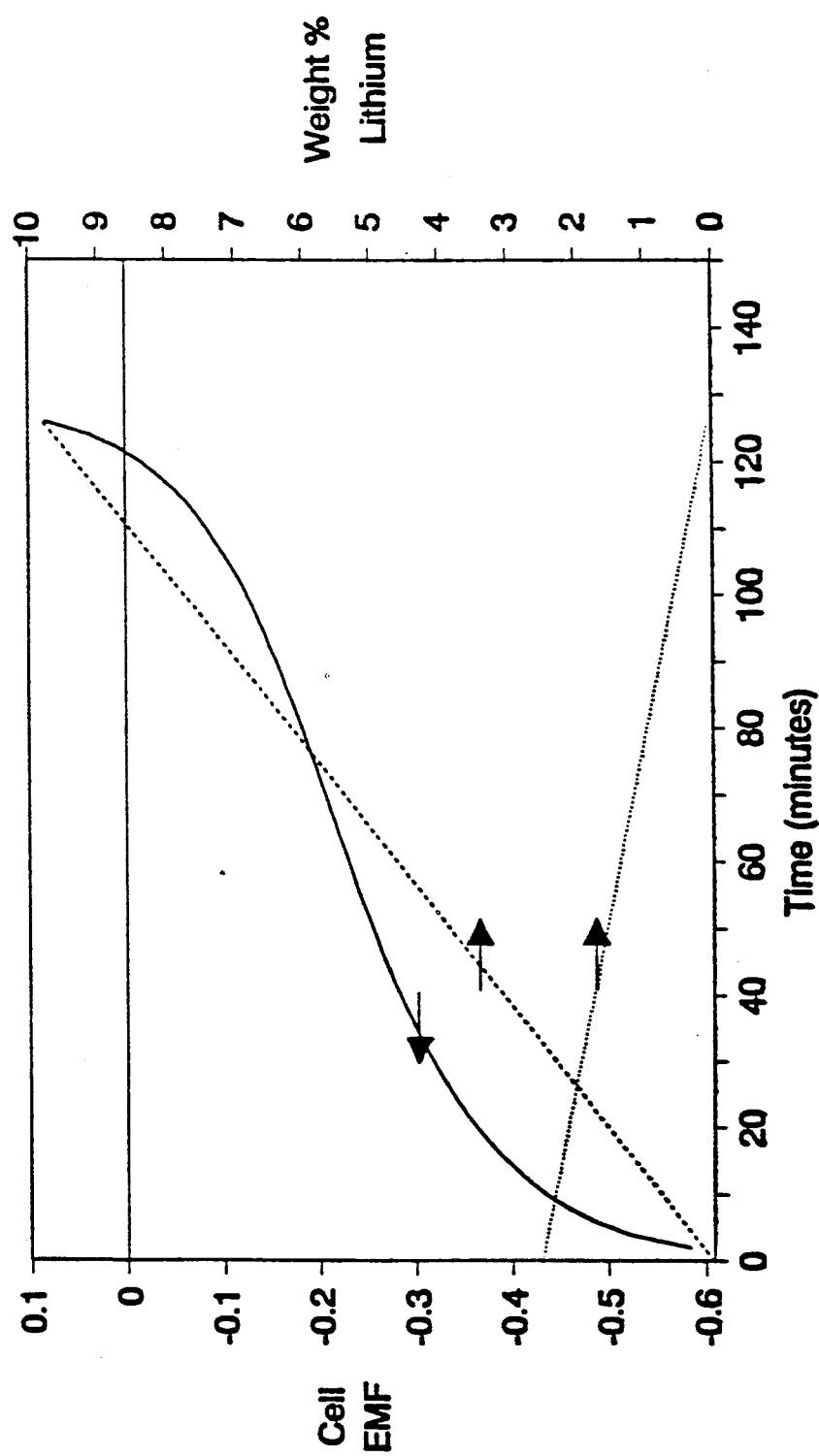
FIG. 3 depicts a graph showing the relationship between cell EMF, processing time and lithium concentration for the present invention.

In one aspect, the inventive process provides improvements over these prior art processes regarding cell EMF by using a pure tin pool as the cathode in the electrorefining cell. Tin has a very high affinity for lithium as evidenced by the very low activity coefficient for lithium in tin. At a temperature of 670° C., the activity coefficient for infinitely dilute lithium in tin is approximately 0.0008. Furthermore, given the great difference in atomic weights between lithium and tin, a small weight percentage of lithium in tin equates to a high mole percent. Thus, when coupled with the low activity coefficient for lithium it is possible to concentrate the lithium in tin to relatively high levels, 25 wt. % or more, while maintaining a very low lithium activity. Using a 100 gram aluminum-lithium pool and a 25 gram tin pool results in a 4:1 concentration step for the lithium in tin and a lowering of lithium in aluminum to less than 0.1 wt. %. Using the same 100 gram aluminum-lithium pool and a 25 gram tin pool, the cell EMF as shown in FIG. 3 can remain negative for approximately the entire electrorefining cycle. This negative cell EMF results in an overall low cell voltage.

Once the lithium becomes extracted from the aluminum-lithium starting pool and is formed into a tin-lithium alloy, the Sn-Li alloy may be recovered by casting under a salt layer and cooled to solidification for further handling or storage of lithium in a safe form.

The salt layer may be any conventional type that is compatible with the Sn-Li to be cast. The casting parameters and conditions such as temperature, types of casting apparatus and molds are also considered to be parameters known to those skilled in the art.

In a further aspect of the present invention, the recovered tin-lithium alloy may be subjected to a subsequent processing step to further recover the lithium component thereof. The methods contemplated by this aspect of the present invention include: an electrolytic recovery process utilizing a low temperature electrolytic cell; vacuum distillation of the lithium metal from the tin; or chemical extraction of the lithium from the Sn-Li alloy.

In the electrolytic cell embodiment, an operating regime would exist that is similar to that for a standard lithium electrowinning cell. Specifically, the cell would comprise the tin-lithium alloy on the bottom, an intermediate salt layer and a lithium layer floating above the salt layer. Table I hereinbelow, lists a number of salt systems which may be used with this lithium refining cell.

TABLE I

| Low Operating Temperature Molten Salt Systems | |
|---|---|
| Eutectic Salt Mixture | Melting Point (°C.) |
| RbCl—LiCl | 318 |
| KBr—LiBr | 348 |
| LiCl—KCl | 361 |
| LiF—LiBr | 453 |

Since both metals have very low melting points, tin at 230° C. and lithium at 180° C., any of the above listed eutectic salt mixtures would be acceptable. The preferred melt mixture would be LiCl-KCl since it is an all chloride melt and has the lowest component cost.

Electrolytic recovery in a low temperature electrolytic cell should have a significantly higher current efficiency than a high temperature cell due to the lower lithium solubility in the molten salt and slower kinetics for an oxidation reaction of the recovered lithium metal. The higher current efficiency can offset the expected higher cell voltages caused by the small activity coefficient of lithium in tin.

In a second embodiment concerning extraction of lithium from the tin-lithium alloy, vacuum distillation may be utilized. In this method, the vacuum distillation step may be performed at much lower temperatures than temperatures required for vacuum distillation of aluminum-lithium alloys. Temperatures in the range of 900°-1200° C. are necessary for removal and recovery of lithium from Al-Li alloys. Subjecting aluminum-lithium alloys to such temperatures increases the severity of the corrosive nature and volatility of these alloys as has been described hereinabove. Recovering lithium from a tin-lithium alloy by vacuum distillation eliminates the hazards associated with these Al-Li alloys.

Table II details vapor pressures for pure tin and lithium in tin for various temperatures and concentrations of lithium.

TABLE II

| Calculated Vapor Pressures for Tin and Lithium | | |
|---|---|---|
| Sn: | | Vapor Pressure |
| C | K | (mm Hg) |

TABLE II-continued

Calculated Vapor Pressures for Tin and Lithium

| | | |
|---|---|---|
| 232 | 505 | 3.44E-23 |
| 300 | 573 | 1.51E-19 |
| 400 | 673 | 1.58E-15 |
| 500 | 773 | 1.51E-12 |
| 600 | 873 | 2.99E-10 |
| 700 | 973 | 1.99E-08 |

| Li: | | | Vapor Pressure (mm Hg) Wt. % | | |
|---|---|---|---|---|---|
| | | | 10% | 1% | 0.1% |
| | | Approx. | | Mol Frac | |
| C | K | Act. Coef | 0.6552 | 0.1473 | 0.0170 |
| 232 | 505 | 1.17E-06 | 7.18E-15 | 1.62E-15 | 1.86E-16 |
| 300 | 573 | 7.03E-06 | 3.63E-12 | 8.15E-13 | 9.40E-14 |
| 400 | 673 | 5.11E-05 | 3.41E-09 | 7.67E-10 | 8.84E-11 |
| 500 | 773 | 2.22E-04 | 5.35E-07 | 1.20E-07 | 1.39E-08 |
| 600 | 873 | 6.90E-04 | 2.60E-05 | 5.84E-06 | 6.74E-07 |
| 700 | 973 | 1.70E-03 | 5.62E-04 | 1.26E-04 | 1.46E-05 |

As can be seen from Table II, over a temperature range of 232° C. to 700° C., the vapor pressure of lithium is at least 3 orders of magnitude greater than that of tin. This difference in vapor pressure has been shown to be a minimum set point for achieving suitable separation of lithium from tin by vacuum distillation. Although the rate of removal and recovery has not been identified to date, it is anticipated that the vacuum distillation operating temperature should be at least 300° C. higher than the melting point of the highest melting point component. Based upon tin having a 232° C. melting point, the operating temperature of the vacuum distillation step should be at least approximately 532° C. This low temperature provides advantages in minimizing corrosion as well as air infiltration during the process. It should be noted that a critical aspect of the vacuum distillation process is the maintenance of a vacuum and the prevention of any air ingress into the reactor.

The third embodiment of lithium recovery entails recovering the lithium as a compound such as LiCl. In a preferred method, a molten alloy conversion may be utilized wherein a chlorine gas would be injected into a tin-lithium molten alloy bath at a temperature of at least approximately 500° C. to produce a LiCl salt. The produced lithium chloride salt may then be recovered in conventional fashion.

Alternatively, an aqueous method may be utilized which comprises comminuting the recovered Sn-Li alloy into small particles and reacting the small alloy particles in a hydrochloric acid/water solution to selectively remove the lithium by lithium chloride formation.

The two possible reactions using a tin-lithium alloy and chlorine would be as follows:

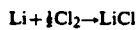

and

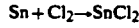

Of these two reactions, the first reaction is highly favored. Thermodynamic calculations predict that it would be possible to remove lithium to a concentration of $10^{-25}$ before coremoval of tin becomes a problem. Thus, in this embodiment when producing a lithium chloride product, a high degree of lithium extraction may be achieved. This by-product lithium salt may be recovered in a high purity form for re-sale in any known manner or may be used as part of an electrolytic mixture in lithium electrowinning cells.

As such, an invention has been disclosed in terms of preferred embodiments thereof which fulfill each and every one of the objects of the invention as set forth hereinabove and provides a new and improved method of extracting lithium from aluminum-lithium alloys.

Of course, various changes, modifications and alterations in the teachings of the present invention may be contemplated by those skilled in the art without departing from the intended spirit and scope thereof. As such, it is intended that the present invention only be limited by the terms of the appended claims.

I claim:

1. A method for the separation of lithium from an aluminum-lithium alloy which comprises:
    a) providing an electrorefining cell which initially contains a cathode comprising a substantially pure tin (Sn) pool;
    b) maintaining an aluminum-lithium alloy in molten form in said cell;
    c) passing an electric current through said cell and maintaining a negative cell electromotive force, whereby the lithium from said molten aluminum-lithium alloy dissolves in the tin (Sn) pool and forms a tin-lithium alloy; and
    d) removing the tin-lithium alloy from the cell.

2. A method according to claim 1 wherein the recovered tin-lithium alloy is cast under a salt layer and cooled to solidification.

3. A method for the recovery of lithium from said tin-lithium alloy produced in claim 1 selected from the following procedures:
    a) electrolytic recovery in a separate low temperature electrolytic cell;
    b) vacuum distillation of the lithium metal away from the tin; or
    c) chemical extraction of the lithium from the tin-lithium alloy.

4. The method of claim 3, wherein said chemical extraction of lithium from said tin-lithium alloy further comprises the steps of:
    a) providing said tin-lithium alloy as a molten bath;
    b) injecting a chlorine gas into said molten tin-lithium alloy bath to form lithium chloride; and
    c) recovering said lithium chloride.

5. The method of claim 4 wherein said molten tin-lithium bath is maintained at a temperature of at least approximately 500° C.

6. The method of claim 3, wherein said electrolytic recovery in a separate low temperature electrolytic cell further comprises the steps of:
    a) providing said tin-lithium alloy as a molten bath bottom layer in an electrolytic cell;
    b) providing a molten salt layer floating on top of said molten tin-lithium alloy bath;
    c) providing a molten lithium layer floating on top of said molten salt layer;
    d) passing an electric current through said cell whereby lithium from said molten tin-lithium alloy bath is recovered in said molten lithium layer; and
    e) removing said molten lithium layer from said electrolytic cell.

7. The method of claim 6 wherein said molten salt layer is selected from the group consisting of RbCl-LiCl, KBr-LiBr, LiCl-KCl and LiF-LiBr.

8. The method of claim 7 wherein said molten salt layer is LiCl-KCl.

9. The invention of claim 3 wherein said vacuum distillation of said lithium metal alloy from said tin is performed at a temperature of at least approximately 532° C.

10. The method of claim 1 wherein the lithium content of said tin-lithium alloy ranges in an amount up to 25% by weight.

* * * * *